United States Patent [19]

Bruce

[11] 3,914,874

[45] Oct. 28, 1975

[54] METHOD AND APPARATUS FOR VACUUM DRYING OF COMMODITIES

[76] Inventor: John M. Bruce, West Highway 16, Mitchell, S. Dak. 57301

[22] Filed: June 7, 1974

[21] Appl. No.: 477,520

[52] U.S. Cl.......................................... 34/15; 34/92
[51] Int. Cl.² ............................................ F26B 5/04
[58] Field of Search.............................. 34/5, 15, 92

[56] References Cited
UNITED STATES PATENTS

| 822,239 | 6/1906 | Bedortha et al. ....................... 34/92 |
| 2,895,400 | 7/1959 | Topf .................................... 34/15 X |
| 3,280,473 | 10/1966 | Sullivan .................................. 34/92 |
| 3,633,283 | 1/1972 | Mishkin et al. .......................... 34/92 |
| 3,672,068 | 6/1972 | Wilkison ................................. 34/92 |

Primary Examiner—John J. Camby
Attorney, Agent, or Firm—Clarence A. O'Brien; Harvey B. Jacobson

[57] ABSTRACT

Dual elongated vacuum chambers are communicated with an airtight storage enclosure and valve controlled for selective communication therewith. Each chamber includes a heat exchange unit coupled to a single reversible heat pump. A motor driven vacuum pump and blower are communicated with the vacuum chambers through valving which allows for a selective evacuation of one chamber and then the other in accordance with the operation of the heat pump whereby a high efficiency continuous vacuum drying of the material within the storage enclosure is effected.

10 Claims, 6 Drawing Figures

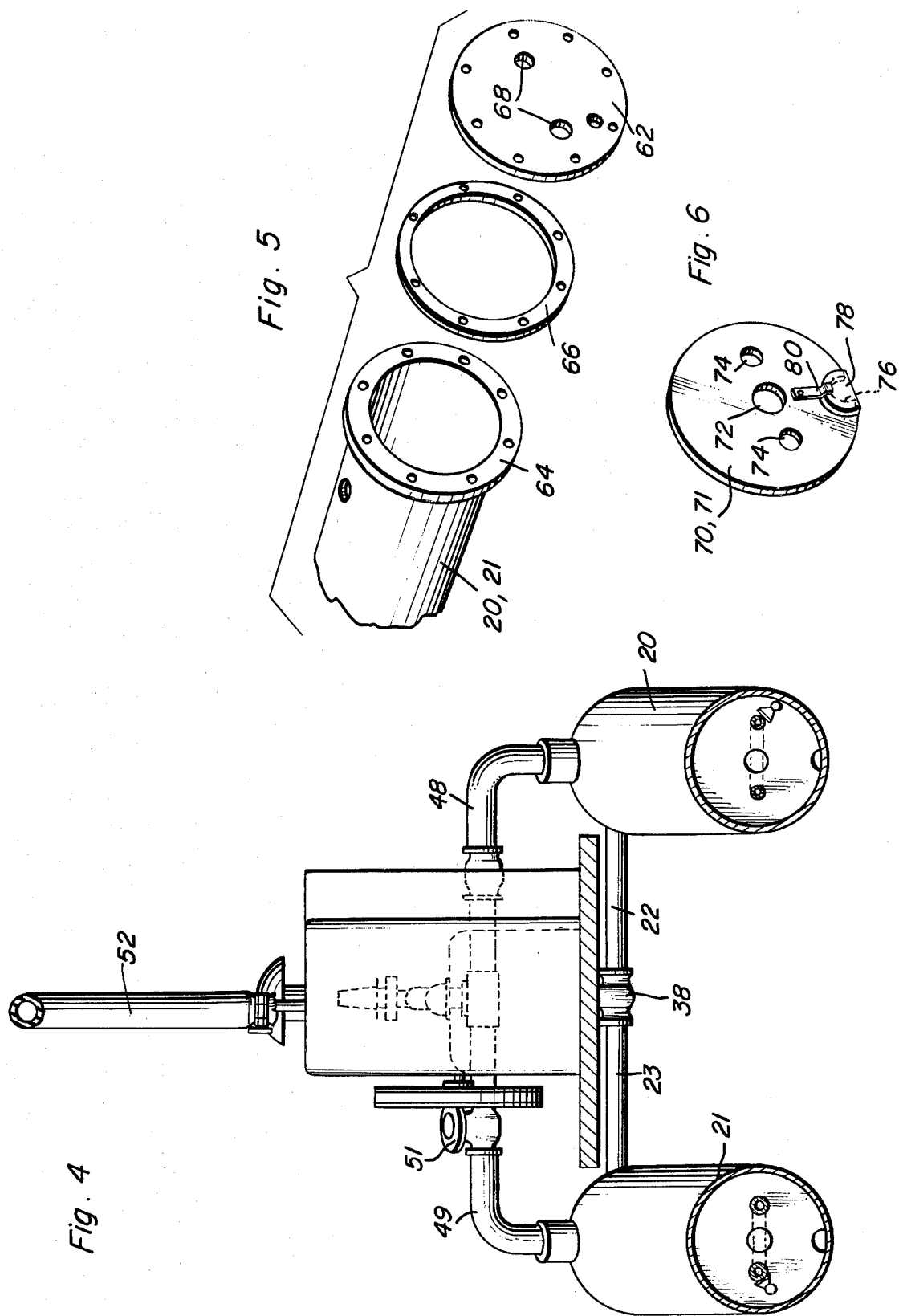

METHOD AND APPARATUS FOR VACUUM DRYING OF COMMODITIES

The present invention generally relates to a vacuum drying system wherein dual heat exchange evacuation chambers are alternatively cooled and communicated with a material storage enclosure for the evacuation and condensation of moisture.

While not specifically limited thereto, it is contemplated that the system of the invention find particular adaptability for use in the vacuum drying of corn, grain and other farm produce. In utilizing this system for crop or produce drying in particular, it is contemplated that an effective reduction of the moisture content can be rapidly and effectively achieved without in any manner adversely affecting the produce, contrary to the hot air drying processes normally utilized.

Among the objects of the invention are the provision of apparatus which is capable of automatic continuous operation in evacuating storage enclosures and both withdrawing the moisture therefrom and condensing the moisture for subsequent discharge exteriorly of the enclosure; the provision of apparatus which is of a compact nature capable of being trailer mounted and easily movable from one storage enclosure to another; and the provision of apparatus which is, while highly unique, of a relatively simple construction requiring little maintenance.

Basically, the apparatus includes dual elongated vacuum chambers each containing heat exchangers coupled to a single reversible heat pump. Each of the vacuum chambers is in valve controlled communication with a line leading to an airtight storage enclosure. In addition, each vacuum chamber is in valve controlled communication with a vacuum pump. Through appropriate controls, the vacuum chambers are alternatively brought to a temperature below freezing, communicated with the storage enclosure, and, by the vacuum pump means, evacuated so as to draw a vacuum on the storage enclosure and move moisture-laden air therefrom into the vacuum chamber where the moisture is condensed and collects within the vacuum chamber. Upon a collection of so much moisture, condensed into ice particles, as to reduce the efficiency of the apparatus, the second vacuum chamber is brought into operation following the above described steps while the initial vacuum chamber is, through the valves, disconnected from both the storage enclosure and the vacuum pump and, through the reversible heat pump, heated so as to melt the collected frozen moisture therein for subsequent discharge through appropriate drain means.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 4 is a transverse view taken through the apparatus substantially on a plane passing along line 4—4 in FIG. 3;

FIG. 5 is an exploded detail of one end of one of the vacuum chambers; and

FIG. 6 is a perspective view of one of the internal heat exchange baffles.

Figure 1:
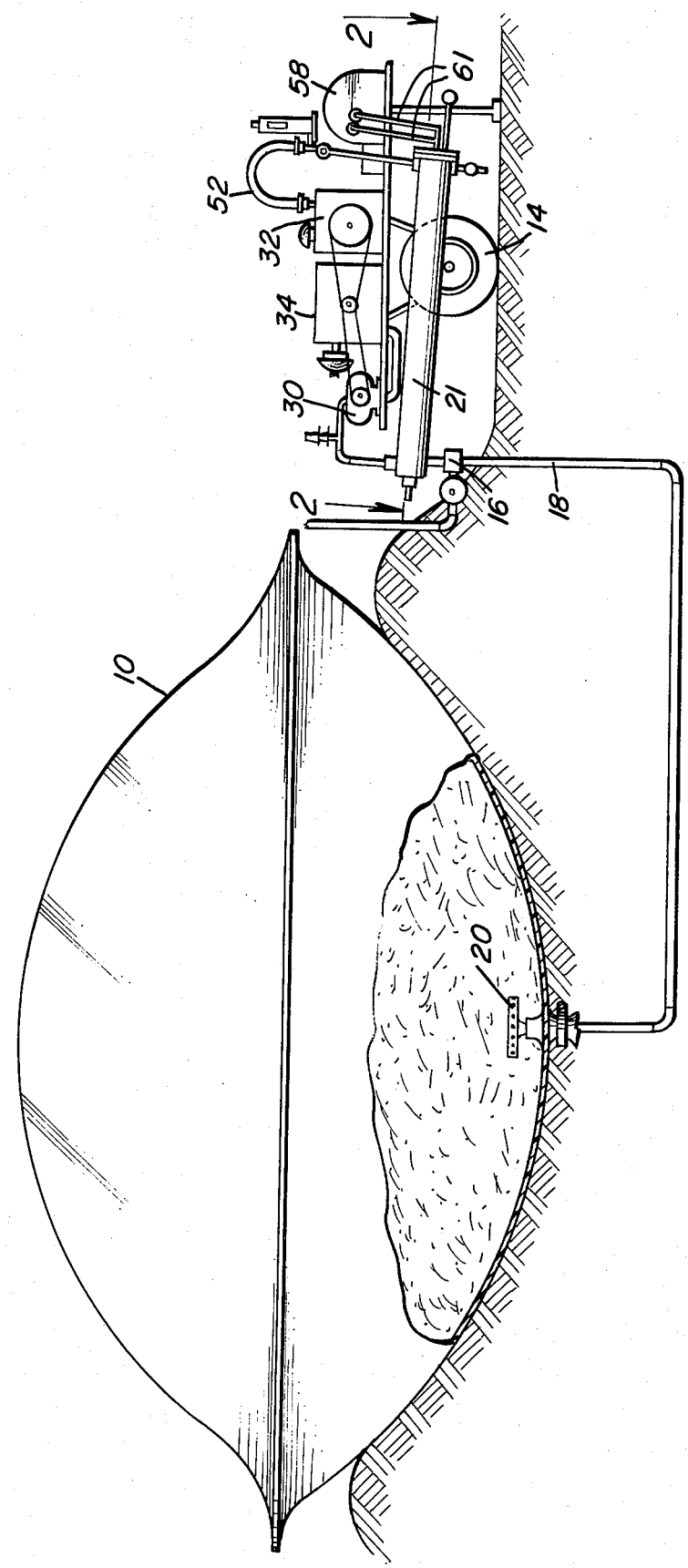
FIG. 1 is a side elevational view of the apparatus of the invention coupled to a storage enclosure.

With reference initially to FIG. 1, reference numeral 10 is used to generally designate an airtight storage enclosure for receiving the material to be vacuum dried. This enclosure 10 can be of any appropriate construction including an enlarged sealed flexible bag as suggested in FIG. 1, a sealed grain bin, a grain elevator, etc., requiring only the ability to be sufficiently airtight as to enable the evacuation of air therefrom so as to create at least a partial vacuum condition.

The actual drying apparatus is generally designated by reference numeral 12 and will preferably be mounted on a mobile chassis 14 enabling a movement thereof for use with multiple storage enclosures 10. In each instance, the apparatus will be releasably coupled, as at 16, to an air flow line 18 communicated, through an appropriate filter 20, with the interior of the material enclosure 10.

Figure 2:
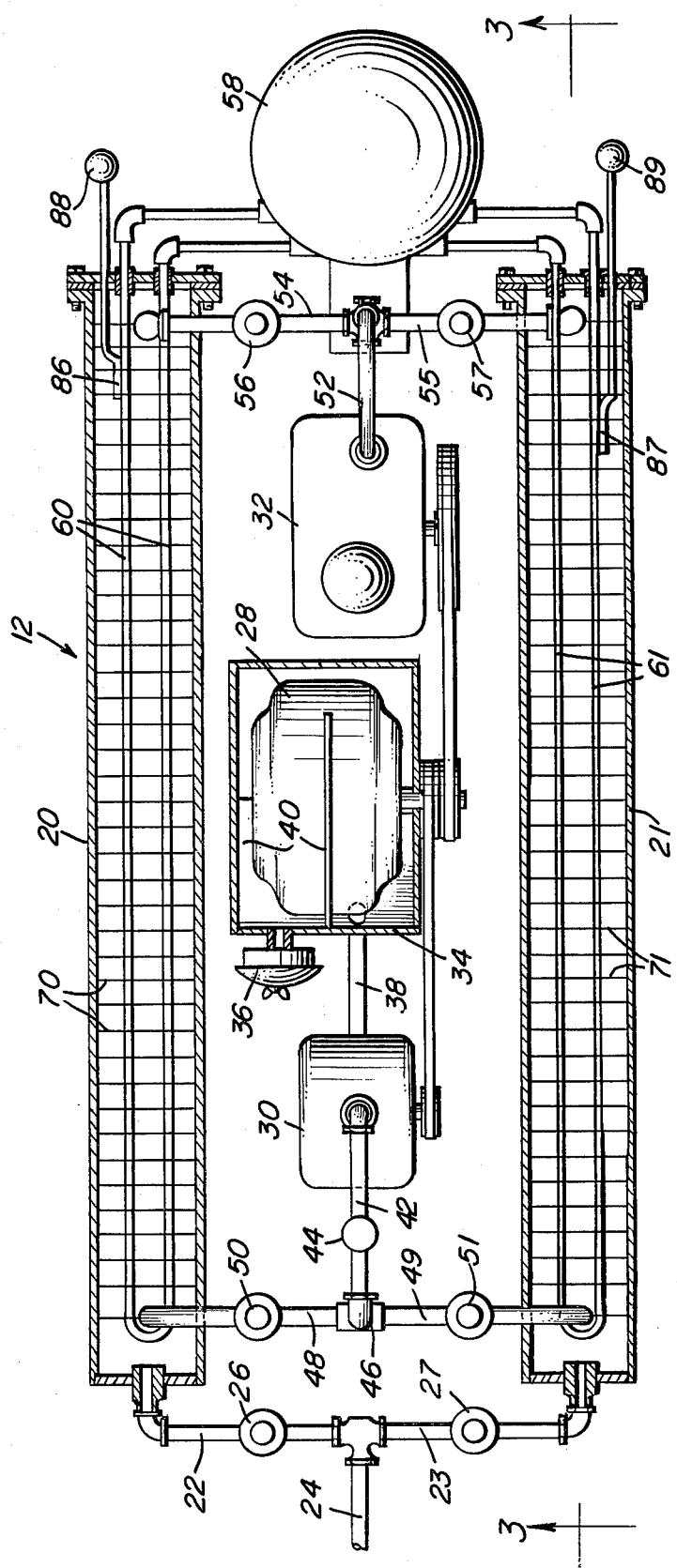
FIG. 2 is an enlarged horizontal view of the apparatus, portions thereof being shown in section.
Figure 3:
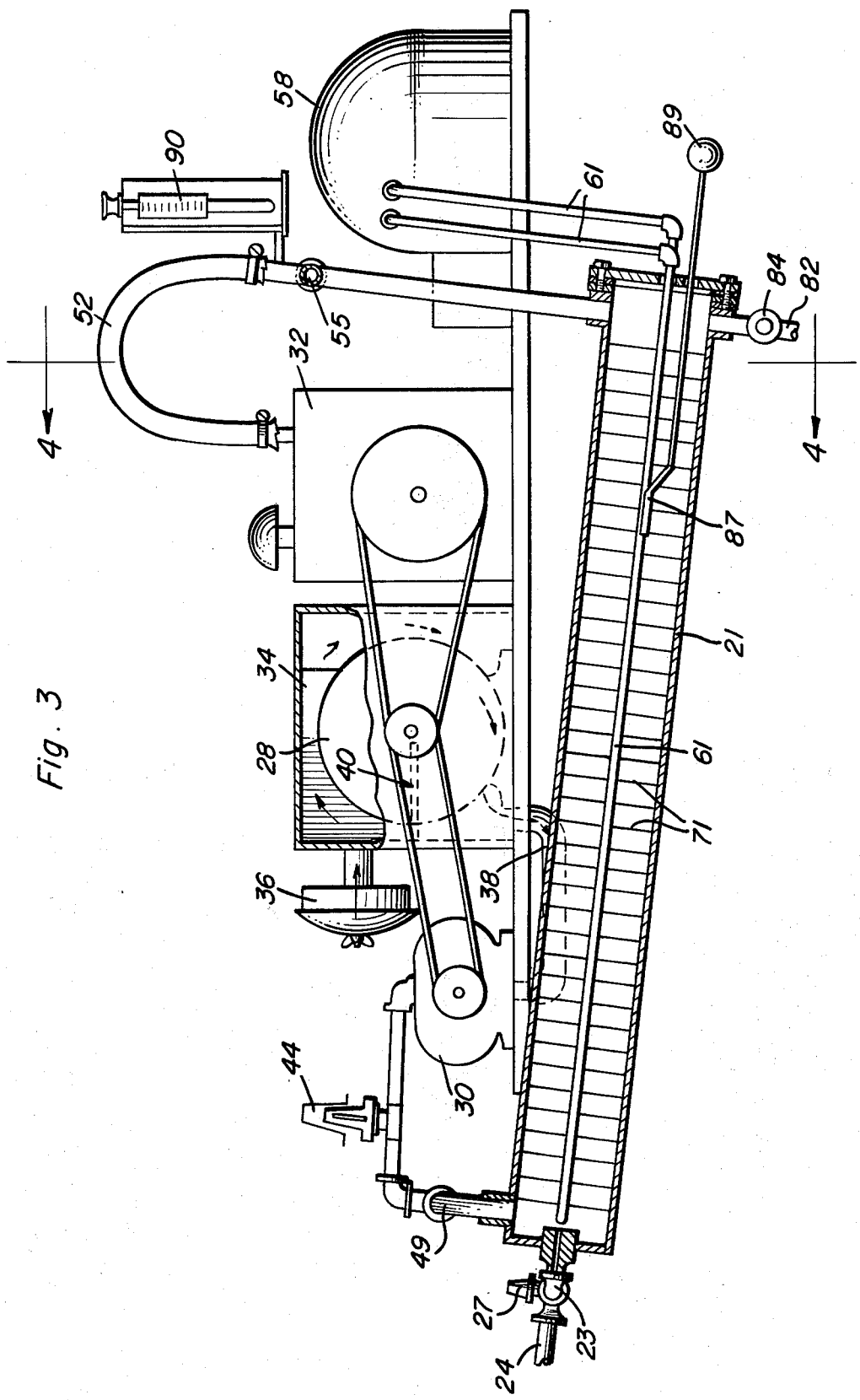
FIG. 3 is a vertical view of the apparatus taken substantially on a plane passing along line 3—3 in FIG. 2.

With reference now particularly to the apparatus 12, attention is particularly directed to FIGS. 2 and 3. The apparatus 12 includes a pair of laterally spaced elongated vacuum chambers 20 and 21. The forward end of each of the chambers 20 and 21 has an intake line, respectively designated by reference numerals 22 and 23 communicated therewith and extending to a common intake line 24 which, in use, is coupled to the storage enclosure line 18. The lines 22 and 23 respectively include open-close valves 26 and 27 therein whereby an alternate communication of one than the other of the vacuum chambers 20 and 21 with the storage enclosure 10 can be effected.

A centrally located housing enclosed motor 28 is located between the vacuum chambers 20 and 21. This motor drives a forwardly located blower 30 and a rearwardly located vacuum pump 32. The closed housing 34 for the motor 28 includes an upper air filtering intake 36 and a lower discharge duct 38 leading to the blower 30. The interior of the housing 34 is provided with appropriate baffles 40 which guide air entering through the filtered inlet 36 completely about the motor 28, for a cooling of the motor and a corresponding heating of the air, to the blower communicated duct 38. The blower 30 includes a discharge line 42, including a pressure release 44, which communicates, through a T-coupling 46, with a pair of laterally directed lines 48 and 49 which respectively feed into the forward ends of the vacuum chambers 20 and 21. These lines 48 and 49 are appropriately alternately opened and closed by valves 50 and 51. The rear portion of each of the vacuum chambers 20 and 21 are respectively communicated with a vacuum pump intake line 52 by chamber communicated lines 54 and 55 extending from the rear of the chambers and individually controlled by open-close valves 56 and 57.

A reversible motor driven heat pump 58 is located just to the rear of the vacuum chambers 20 and 21 and includes two oppositely directed sets of heating and cooling coils 60 and 61 which respectively extend through the lengths of the vacuum chambers 20 and 21. As detailed in FIG. 5, the rear of each of the vacuum chambers is provided with an apertured end plate 62 adapted to be sealed to the flanged end 64 of the corresponding vacuum chamber with an intervening sealing gasket 66. The apertures 68 within the end plate 62 are to accommodate the passage of the corresponding heating and cooling coils extending from the heat pump 58.

The interior of each of the vacuum chambers 20 and 21 is provided with a series of spaced baffles or baffle plates respectively designated by reference numerals 70 and 71. FIG. 6 illustrates a typical one of these baffles which includes a central air flow opening 72, a pair of laterally spaced coil-accommodating openings 74, and a lower edge draining cutout 76 selectively closed by a flap 78 controlled by a bimetallic thermostatic element 80 which raises or opens the flap 78 upon the temperature within the corresponding chamber raising to a certain point for purposes which shall be described presently. As will be noted from FIG. 3 in particular, each of the chambers 20 and 21 slope downwardly and rearwardly and include, at the lower rear end, a drain 82 appropriately controlled by a valve 84.

Mounted within each of the chambers 20 and 21 are thermostats respectively designated by reference numerals 86 and 87, each thermostat including an associated thermostatic switch 88 and 89 which respectively control the valves 56 and 57. As required, appropriate Deubrovin gauges 90 can be provided to determine the efficiency of the operation of the vacuum pump and provide a constant reading.

In operation, the heat pump 58 is activated so as to initiate a cooling of the coils 61 within the vacuum chamber 21 and a corresponding warming of the coils 60 within the chamber 20. When the thermostat 87 senses a predetermined low temperature, for example 20°F., the thermostatic switch 89 opens the normally closed vacuum line valve 57 so as to communicate the vacuum chamber 21 with the vacuum pump 32 for an evacuation thereof. Simultaneously, the valve 50 is opened so as to permit circulation of warm air from the motor, through the blower and line 48 into the chamber 20 for movement therethrough and discharge through the associated valve controlled drain 82. After the chamber 21 has been evacuated, normally closed valve 27 is opened. This can be effected automatically by an appropriate 60 second delay switch or the like also controlled by the thermostatic switch 89. Upon an opening of the valve 27, a vacuum is drawn within the storage enclosure 10. This in turn will, due to the decrease pressure within the enclosure 10, tend to vaporize the moisture therein with the vaporized moisture being drawn into the vacuum chamber 21 which, as previously indicated, has been reduced in temperature to at or below a predetermined point, approximately 20°F.

Due to the restrictive nature of the central baffle openings 72, the gaseous vapor is slowed in its movement through the chamber 21 and condenses therein, forming in effect a frost buildup on the internal baffles 71, trapping all condensible matter while dry air exits through the valve controlled linee 55 for discharge from the vacuum pump 32.

Upon the buildup of frozen matter within the chamber 21 to a point where efficiency drops off, the heat pump 58 can be reversed. This will normally be controlled by a timing mechanism set to the particular external conditions and materials involved. Upon a reversing of the pump, valve 27 closes, terminating communication between the storage enclosure 10 and the vacuum chamber 21, valve 51 opens so as to communicate the blower driven motor heated air with the chamber 21, and drain valve 84 opens to allow for a drainage of the chamber 21. Under these conditions, as the coils 61 are heated, a defrosting action takes place within the chamber 21. Upon a rising of the temperature within the chamber 21 to a predetermined point, the thermostatic element 80 associated with each baffle 71 opens the flap 78 so as to allow for a drainage of the water through the baffle cutouts to the lower rear end of the chamber 21 at which point the water and materials collected therewith discharge through the drain 82. As this is occurring, the coils 60 are lowering the temperature within the vacuum chamber 20. Upon a lowering of the temperature therein to approximately 20°F., the sequence of steps described above in conjunction with the chamber 21 and associated valve controlled lines, is followed in conjunction with the valve controlled lines associated with the chamber 20. In this manner, the apparatus 12 is run at constant peak efficiency, alternating between the chambers 20 and 21 and the associated valve controlled flow paths. As will be appreciated, most efficient operation will be effected through an automatic operation of the various controls responsive to temperature and/or pressure conditions or operated on a specific timed cycle. It will of course be appreciated that valves 26, 50 and 56 respectively operate and respond to the associated conditions in the same manner as above described valves 27, 51 and 57. By the same token, the thermostat 86 and associated switch 88 function as the thermostat and associated switch 87 and 89.

The resultant system has been found to be a highly effective means for the drying of farm produce and the like without damage thereto as is commonly experienced in the more normal heat drying procedures frequently used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A vacuum drying system comprising dual vacuum chambers, intake means extending from said vacuum chambers for alternately communicating each chamber with a storage enclosure for material to be dried, heat exchange means for alternately raising the temperature in one chamber and lowering the temperature in the other chamber, and means for alternately evacuating the chambers and the storage enclosure communicated with each chamber during the evacuation thereof.

2. A vacuum drying system comprising dual vacuum chambers, intake means extending from said vacuum chambers for alternately communicating each chamber with a storage enclosure for material to be dried, heat exchange means for alternately raising the temperature in one chamber and lowering the temperature in the other chamber, and means for alternately evacuating the chambers and the storage enclosure communicated with each chamber during the evacuation thereof, said heat exchange means comprising a reversible heat pump, coils extending from the heat pump to and through each chamber, and a plurality of heat exchange baffles at spaced points along each chamber.

3. The system of claim 2 wherein the means for alternately evacuating the chambers comprises a vacuum pump and a valve controlled line extending from each chamber to the vacuum pump.

4. The system of claim 3 including blower means for alternately introducing heated air into said chambers.

5. The system of claim 4 including a housing enclosed motor drivingly engaged with the vacuum pump and the blower, pipe means extending from the motor housing to the blower for the movement of motor warmed air to said blower, and valve controlled piping extending from the blower to each chamber for the alternate introduction of the warmed air thereto.

6. The system of claim 5 wherein each chamber slopes toward a valve controlled discharge pipe, each of said baffles including a temperature responsive port therethrough for the drainage of accumulated liquid upon the elevation of the temperature therein to a predetermined point.

7. The system of claim 2 wherein each chamber slopes toward a valve controlled discharge pipe, each of said baffles including a temperature responsive port therethrough for the drainage of accumulated liquid upon the elevation of the temperature therein to a predetermined point.

8. The system of claim 2 wherein the means for alternately evacuating the chambers comprises a vacuum pump and a valve controlled line extending from each chamber to the vacuum pump.

9. A method of vacuum drying commodities comprising the steps of placing the commodities within an airtight enclosure, drawing a vacuum within the enclosure and extracting moisture laden air through a first cooled vacuum chamber, switching to a second vacuum chamber and drawing moisture laden air from the enclosure therethrough while draining the first vacuum chamber, and continually alternating the chambers until a predetermined drying of the commodities is achieved.

10. The method of claim 9 including the step of introducing heated air into each chamber during the drainage of the moisture therefrom.

* * * * *